(12) United States Patent
Lazaridis

(10) Patent No.: US 8,682,394 B2
(45) Date of Patent: *Mar. 25, 2014

(54) COLOR DIFFERENTIATING A PORTION OF A TEXT MESSAGE SHOWN IN A LISTING ON A HANDHELD COMMUNICATION DEVICE

(75) Inventor: Mihal Lazaridis, Waterloo (CA)

(73) Assignee: BlackBerry Limited, Waterloo (CA)

(*) Notice: Subject to any disclaimer, the term of this patent is extended or adjusted under 35 U.S.C. 154(b) by 57 days.

This patent is subject to a terminal disclaimer.

(21) Appl. No.: 12/917,123

(22) Filed: Nov. 1, 2010

(65) Prior Publication Data

US 2011/0045854 A1    Feb. 24, 2011

Related U.S. Application Data

(63) Continuation of application No. 11/859,614, filed on Sep. 21, 2007.

(51) Int. Cl.
*H04M 1/00* (2006.01)
*H04B 1/38* (2006.01)

(52) U.S. Cl.
USPC ..... 455/566; 455/411; 455/412.1; 455/412.2; 455/414.1; 455/418; 455/419; 455/466; 455/550.1; 455/567; 370/310.2; 370/338; 709/202; 709/206; 709/229; 704/270

(58) Field of Classification Search
USPC ........ 455/411, 412.1, 412.2, 414.1, 418–419, 455/466, 550.1, 567, 566; 370/310.2, 338; 709/202, 206, 229; 704/270
See application file for complete search history.

(56) References Cited

U.S. PATENT DOCUMENTS 5,675,733 A    10/1997  Williams
5,694,616 A    12/1997  Johnson et al.
(Continued)

FOREIGN PATENT DOCUMENTS

CN    1431615 A    7/2003
EP    0413537 A2   2/1991
(Continued)

OTHER PUBLICATIONS

Win32 based sensor for email auditing, Budnikov, K.I.; Kurochkin, A.V.; Lylov, S.A., IEEE Region 8 International Conference on Computational Technologies in Electrical and Electronics Engineering, 2008. SIBIRCON 2008. pp. 286-287, Jul. 21-25, 2008.
(Continued)

*Primary Examiner* — Steve D Agosta
(74) *Attorney, Agent, or Firm* — Hanley, Flight & Zimmerman, LLC.

(57) ABSTRACT

A handheld wireless communication device includes features to send and receive text messages. The handheld wireless communication device is further equipped with a microprocessor configured to run software programs on the device such as text message management program. The text message management program displays a listing of a plurality of received text messages on a display screen and color differentiates at least a portion of the display-listed plurality of received text messages based upon a characteristic common to each received text message. The characteristic common to each display-listed received text message may be a host name that is included in an identification code for the respective text message's sender.

28 Claims, 10 Drawing Sheets

(56) References Cited

U.S. PATENT DOCUMENTS

| | | | |
|---|---|---|---|
| 5,765,170 A | 6/1998 | Morikawa | |
| 5,765,178 A | 6/1998 | Tanaka | |
| 5,802,455 A | 9/1998 | Nishiyama | |
| 6,052,709 A * | 4/2000 | Paul | 709/202 |
| 6,161,130 A * | 12/2000 | Horvitz et al. | 709/206 |
| 6,321,267 B1 * | 11/2001 | Donaldson | 709/229 |
| 6,519,630 B1 | 2/2003 | Hanawa | |
| 6,651,217 B1 | 11/2003 | Kennedy et al. | |
| 6,665,842 B2 | 12/2003 | Nielsen | |
| 6,671,718 B1 | 12/2003 | Meister et al. | |
| 6,700,591 B1 | 3/2004 | Sharpe | |
| 7,072,688 B2 | 7/2006 | Bodnar et al. | |
| 7,096,036 B2 | 8/2006 | Griffin et al. | |
| 7,389,322 B1 | 6/2008 | Miyazawa | |
| 7,499,976 B2 | 3/2009 | Cato | |
| 7,565,404 B2 * | 7/2009 | Gwozdz | 709/206 |
| 7,801,960 B2 * | 9/2010 | Hockey | 709/206 |
| 7,865,555 B2 | 1/2011 | Willey | |
| 7,873,725 B2 | 1/2011 | Westphal | |
| 2001/0026609 A1 | 10/2001 | Weinstein et al. | |
| 2002/0111887 A1 | 8/2002 | McFarlane et al. | |
| 2002/0194002 A1 * | 12/2002 | Petrushin | 704/270 |
| 2003/0084109 A1 | 5/2003 | Balluff | |
| 2003/0135572 A1 | 7/2003 | Katada | |
| 2003/0236847 A1 * | 12/2003 | Benowitz et al. | 709/206 |
| 2004/0018858 A1 * | 1/2004 | Nelson | 455/566 |
| 2004/0030887 A1 | 2/2004 | Harrisville-Wolff et al. | |
| 2004/0068543 A1 | 4/2004 | Seifert | |
| 2004/0103162 A1 | 5/2004 | Meister et al. | |
| 2005/0101296 A1 * | 5/2005 | Ito et al. | 455/411 |
| 2005/0165895 A1 | 7/2005 | Rajan et al. | |
| 2006/0004843 A1 | 1/2006 | Tafoya et al. | |
| 2006/0020672 A1 | 1/2006 | Shannon et al. | |
| 2006/0098650 A1 | 5/2006 | Beninato et al. | |
| 2007/0204063 A1 | 8/2007 | Banister et al. | |
| 2007/0288575 A1 | 12/2007 | Gillum et al. | |
| 2007/0294390 A1 | 12/2007 | Willey | |
| 2008/0168347 A1 | 7/2008 | Hallyn | |
| 2009/0106266 A1 | 4/2009 | Donatelli et al. | |
| 2009/0291665 A1 | 11/2009 | Gaskarth et al. | |
| 2010/0100448 A1 | 4/2010 | Heigold et al. | |
| 2011/0202824 A1 | 8/2011 | Raje | |

FOREIGN PATENT DOCUMENTS

| | | | |
|---|---|---|---|
| EP | 0420779 | A2 | 4/1991 |
| EP | 1096744 | A2 | 5/2001 |
| EP | 1871059 | A1 | 12/2007 |
| GB | 2353679 | A | 2/2001 |
| WO | 9904353 | A1 | 1/1999 |

OTHER PUBLICATIONS

United States Patent and Trademark Office, Office Action issued in U.S. Appl. No. 11/859,614, issued May 13, 2011, 11 pages.
United States Patent and Trademark Office, Office Action issued in U.S. Appl. No. 11/859,614, issued Dec. 10, 2010, 11 pages.
United States Patent and Trademark Office, Office Action issued in U.S. Appl. No. 11/859,614, issued Jun. 10, 2010, 11 pages.
United States Patent and Trademark Office, Notice of Allowance issued in U.S. Appl. No. 11/859,614, issued Jul. 23, 2012, 31 pages.
United States Patent and Trademark Office, Office Action issued in U.S. Appl. No. 12/621,166, dated Oct. 7, 2011, 10 pages.
United States Patent and Trademark Office, Office Action issued in U.S. Appl. No. 12/621,166, dated Mar. 14, 2012, 10 pages.
United States Patent and Trademark Office, Examiner's Answer issued in U.S. Appl. No. 12/621,166, dated Jan. 4, 2013, 6 pages.
European Patent Office, Examination Report issued in European Patent Application No. 10184583.2, dated Jun. 14, 2013, 5 pages.
Canadian Intellectual Property Office, Office Action issued in Canadian Patent Application No. 2,638,879, dated Oct. 13, 2011, 4 pages.
State Intellectual Property Office of People's Republic of China, Office Action issued in CN application 200810148993.1, dated Feb. 5, 2013, 5 pages.
European Patent Office, Decision to Refuse a European Patent Application issued in European Patent Application No. 07117003.9, dated Jun. 21, 2011, 14 pages.
European Patent Office, Extended European Search Report issued in European Patent Application No. 07117003.9, dated Dec. 3, 2007, 7 pages.
State Intellectual Property Office of People's Republic of China, Office Action issued in CN application 200810148993.1, including English translation, dated Mar. 23, 2011, 9 pages.
State Intellectual Property Office of People's Republic of China, Office Action issued in CN application 200810148993.1, including English translation, dated Mar. 12, 2012, 10 pages.
Canadian Intellectual Property Office, Office Action issued in Canadian Patent Application No. 2,638,879, dated Jan. 2, 2013, 3 pages.
State Intellectual Property Office of People's Republic of China, Office Action issued in CN application 200810148993.1, including English translation, dated Sep. 29, 2009, 7 pages.
European Patent Office, Examination Report issued in European Patent Application No. 10184583.2, dated Oct. 8, 2012, 5 pages.
European Patent Office, Extended European Search Report issued in EP Application 10184583.2, dated Nov. 29, 2010, 4 pages.

* cited by examiner

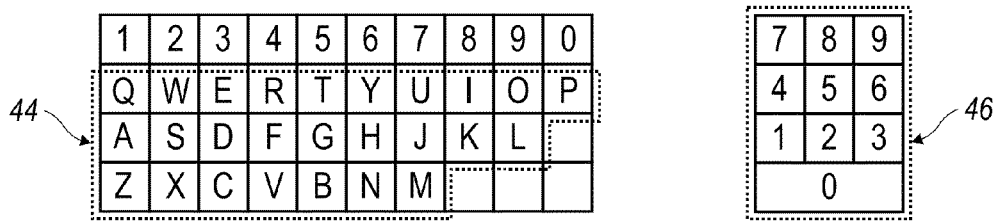
FIG. 4
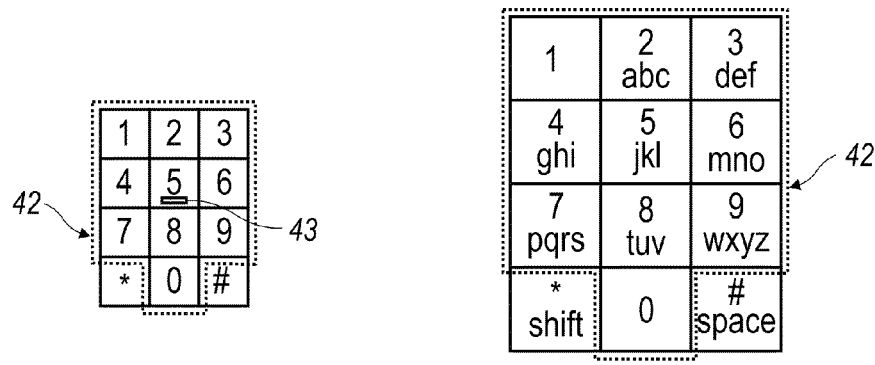
FIG. 5      FIG. 6

COLOR DIFFERENTIATING A PORTION OF A TEXT MESSAGE SHOWN IN A LISTING ON A HANDHELD COMMUNICATION DEVICE

CROSS-REFERENCE TO RELATED APPLICATION

This application is a continuation of, claims benefit of, and incorporates by reference U.S. patent application Ser. No. 11/859,614 titled "Color Differentiating A Portion Of A Text Message Shown In A Listing On A Handheld Communication Device," filed on Sep. 21, 2007, now U.S. Pat. No. 8,265,665.

FIELD

This disclosure, in a broad sense, is directed toward a handheld communication device that has wireless communication capabilities and the networks within which the wireless communication device operates. The present disclosure further relates to color-differentiating an email message based upon a characteristic common to other received email messages.

BACKGROUND

With the proliferation of wireless communication systems, compatible handheld communication devices are becoming more prevalent, as well as advanced. Whereas in the past such handheld communication devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize the entire keyboard surface as efficiently as possible.

Many keyboards on mobile devices have an input device for navigation through the graphical user interface. These interfaces include such devices as trackballs and rotating wheels which can be used to effect movement of a cursor or pointer, or to scroll up, down and about a displayed page. These navigation devices often occupy a relatively large amount of space on the incorporating mobile device. Because the navigation device is frequently used and often requires fine control, a lower end size limitation will normally be observed by device designers. To accommodate such larger, more convenient navigation devices on the housing of the mobile device, the amount of space that is available for the keys of the keyboard is correspondingly reduced if the keyboard and navigational device are proximately located to one another.

As the proliferation of wireless handheld communication devices continue, users increasingly send and receive emails on their handheld communication devices. The screen of a typical handheld device is very small in comparison to a standard desktop computer station. In sending and receiving email messages, many users implement filters on their desktops in order to prioritize or otherwise sort through their incoming and/or outgoing messages. However, users may not implement filters on the messages sent to and from the handheld communication device email software. Thus, an easy way to distinguish the intended recipient or sender of an email message is needed.

BRIEF DESCRIPTION OF THE DRAWINGS

Examplary methods and arrangements conducted and configured according to the advantageous solutions presented herein are depicted in the accompanying drawings wherein:

FIG. 4 illustrates a QWERTY keyboard layout paired with a traditional ten-key keyboard;

FIG. 5 illustrates ten digits comprising the numerals 0-9 arranged in a traditional, ITU Standard E.161 numeric telephone keypad layout, including the * and # keys flanking the 0 key;

FIG. 6 illustrates a traditional or standard phone key arrangement or layout according to the ITU Standard E.161 including both numerals and letters;

DETAILED DESCRIPTION

Figure 1:
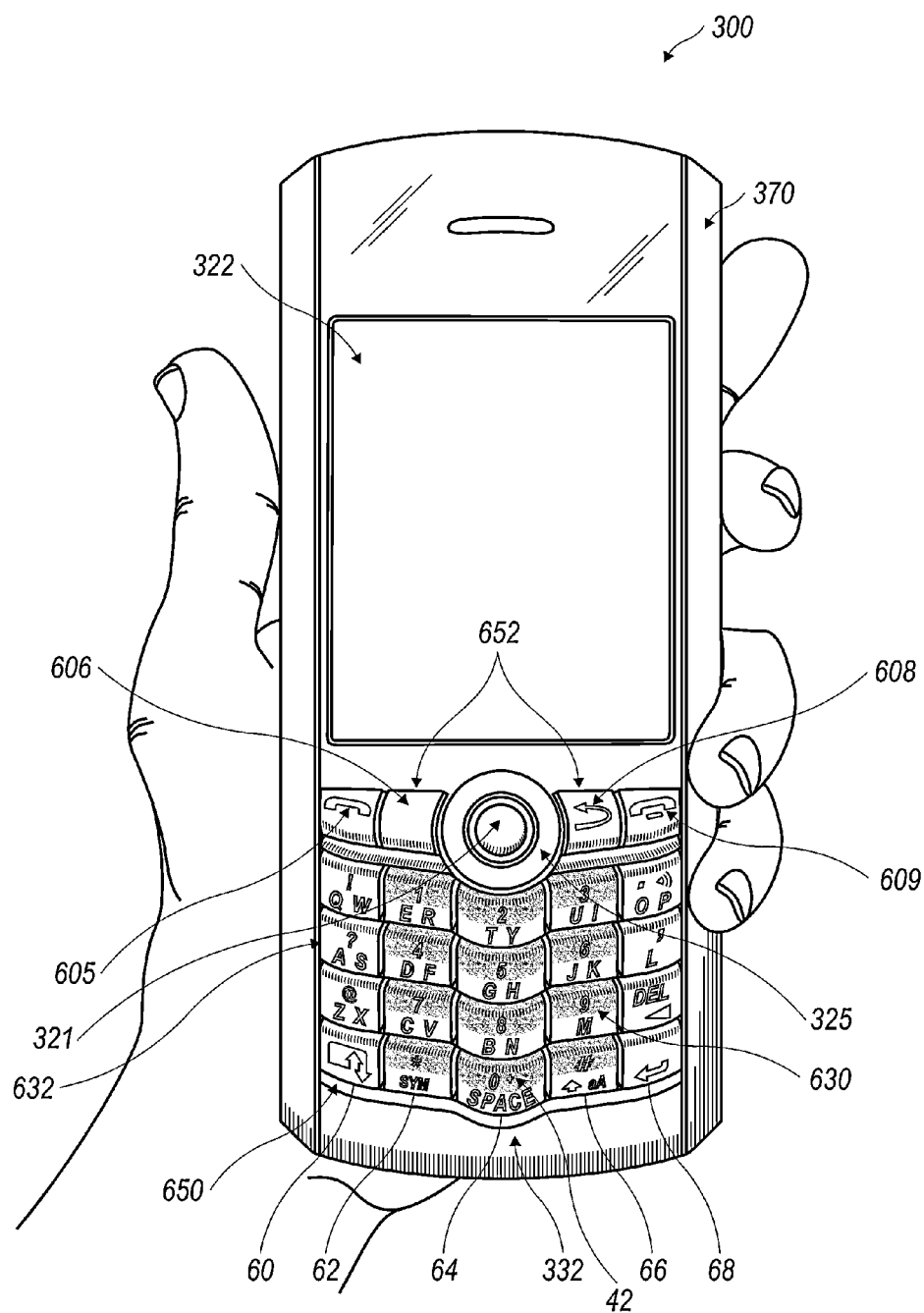
FIG. 1 illustrates a handheld communication device configured according to the present teachings cradled in the palm of a user's hand.
Figure 2:
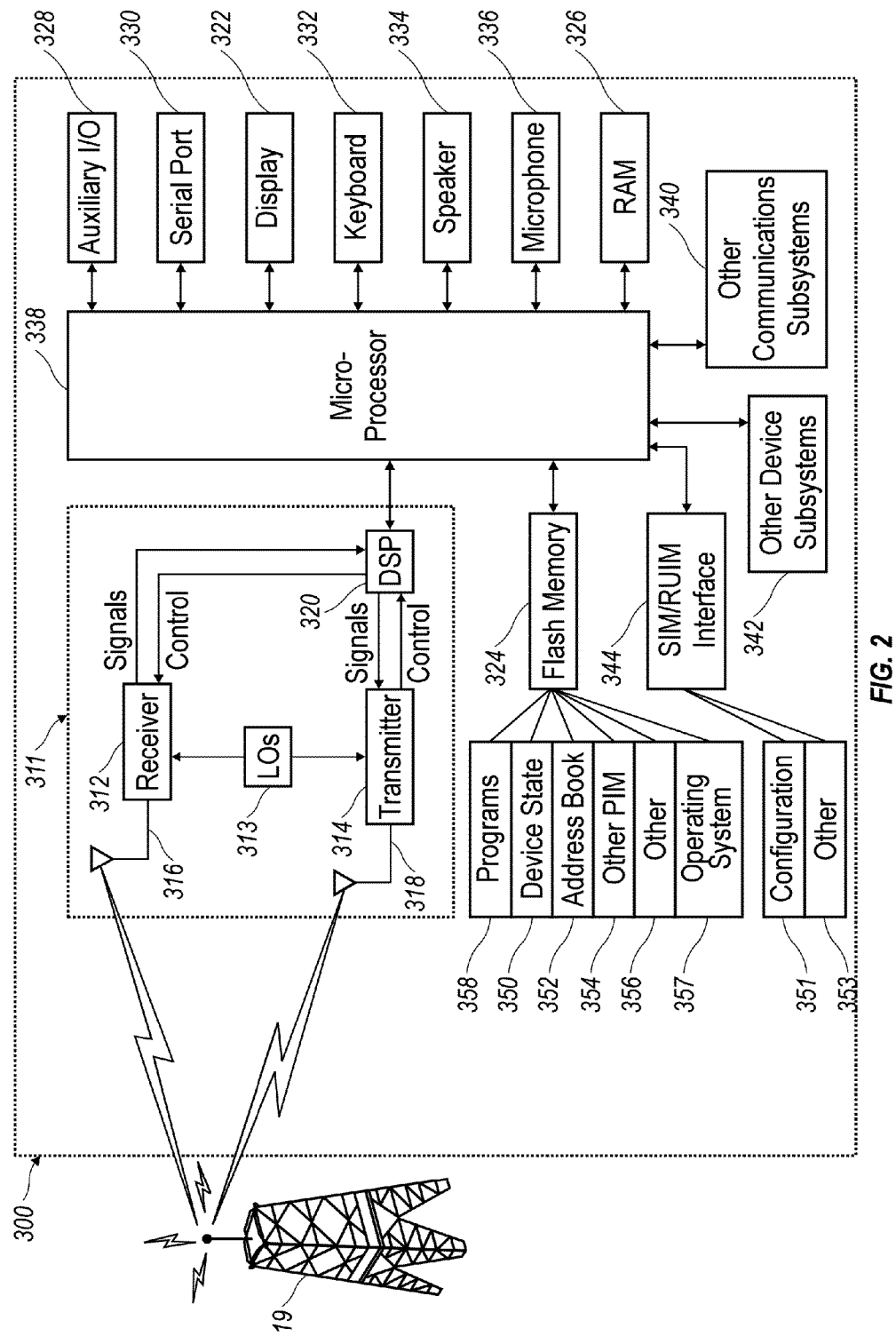
FIG. 2 is a block diagram representing a wireless handheld communication device interacting in a communication network.

An examplary handheld electronic device 300 is shown in FIG. 1, and the device's cooperation in a wireless network 319 is exemplified in the block diagram of FIG. 2. These figures are examplary only, and those persons skilled in the art will appreciate the additional elements and modifications necessary to make the device 300 work in particular network environments.

As shown in the block diagram of FIG. 2, the device 300 includes a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the communication device 300.

The auxiliary I/O subsystem 328 can take the form of a variety of different navigation tools (multi-directional or single-directional) such as a trackball navigation tool 325 as illustrated in the examplary embodiment shown in FIG. 1, or a thumbwheel, a navigation pad, a joystick, or the like. These navigation tools are preferably located on the front surface of the device 300 but may be located on any exterior surface of the device 300. Other auxiliary I/O subsystems can include external display devices and externally connected keyboards (not shown). While the above examples have been provided in relation to the auxiliary I/O subsystem 328, other subsystems capable of providing input or receiving output from the handheld electronic device 300 are considered within the scope of this disclosure. Additionally, other keys may be placed along the side of the device 300 to function as escape keys, volume control keys, scrolling keys, power switches, or user programmable keys, and may likewise be programmed accordingly.

As may be appreciated from FIG. 1, the handheld communication device 300 comprises a lighted display 322 located above a keyboard 332 constituting a user input and suitable for accommodating textual input to the handheld communication device 300. The front face 370 of the device has a navigation row 70 and a key field 650 that includes alphanumeric keys 630, alphabetic keys 632, numeric keys 42, and other function keys as shown in FIG. 1. As shown, the device 300 is of unibody construction, also known as a "candy-bar" design.

Keys, typically of a push-button or push-pad nature, perform well as data entry devices but present problems to the user when they must also be used to effect navigational control over a screen-cursor. In order to solve this problem the present handheld electronic device 300 preferably includes an auxiliary input that acts as a cursor navigational tool and which is also exteriorly located upon the front face 370 of the device 300. Its front face location is particularly advantageous because it makes the tool easily thumb-actuable like the keys of the keyboard. A particularly usable embodiment provides the navigational tool in the form of a trackball 321 which is easily utilized to instruct two-dimensional screen cursor movement in substantially any direction, as well as act as an actuator when the trackball 321 is depressed like a button. The placement of the navigation tool is preferably above the keyboard 332 and below the display screen 322; here, it avoids interference during keyboarding and does not block the user's view of the display screen 322 during use. (See FIG. 1).

As illustrated in FIG. 1, the present disclosure is directed to a handheld wireless communication device 300 configured to send and receive text messages. The device includes a hand cradleable body configured to be held in one hand by an operator of the device during text entry. A display 322 is included that is located on a front face 370 of the body and upon which information is displayed to the operator during text entry. A key field 650 is also located on the front face 370 of the elongate body and comprises a plurality of keys including a plurality of alphanumeric keys, symbol keys, and function keys. A navigation row 70 including menu keys 652 and a navigation tool 327 is also located on the front face 370 of the body. The alphanumeric input keys comprise a plurality of alphabetic and/or numeric keys 632 having letters and/or numbers associated therewith. The order of the letters of the alphabetic keys 632 on the presently disclosed device can be described as being of a traditional, but non-ITU Standard E.161 layout. This terminology has been utilized to delineate the fact that such a telephone keypad as depicted in FIG. 6 may not allow for efficient text entry on the handheld device 300.

The handheld wireless communication device 300 is also configured to send and receive voice communications such as mobile telephone calls. To facilitate telephone calls, two call keys 605, 609 ("outer keys") are provided in the upper, navigation row 70 (so-called because it includes the navigation tool assembly 327) at the outer ends of the navigation row 70. One of the two call keys is a call initiation key 605, and the other is a call termination key 609. The navigation row 70 also includes another pair of keys ("flanking keys") that are located immediately adjacent to the navigation tool 327, with one flanking key on either side of the navigation tool 327. It is noted that the outer keys are referred to as such not because they are necessarily the outermost keys in the navigation row—there may be additional keys located even further outwardly of the outer keys if desired—but rather because they are located outwardly with respect to the flanking keys. The flanking keys may, for instance, constitute the menu keys 652, which include a menu call-up key 606 and an escape or back key 608. The menu call-up key 606 is used to bring up a menu on the display screen 322 and the escape key 608 is used to return to the previous screen or previous menu selection. The functions of the call keys and the menu keys may, of course, be provided by buttons that are located elsewhere on the device, with different functions assigned to the outer keys and the flanking keys.

Furthermore, the device is equipped with components to enable operation of various programs, as shown in FIG. 2. In an examplary embodiment, the flash memory 324 is enabled to provide a storage location for the operating system 408, device programs 358, and data. The operating system 408 is generally configured to manage other application programs 358 that are also stored in memory 324 and executable on the processor 338. The operating system 408 honors requests for services made by application programs 358 through predefined application program 358 interfaces. More specifically, the operating system 408 typically determines the order in which multiple applications 358 are executed on the processor 338 and the execution time allotted for each application 358, manages the sharing of memory 324 among multiple applications 358, handles input and output to and from other device subsystems 342, and so on. In addition, users can typically interact directly with the operating system 408 through a user interface usually including the keyboard 332 and display screen 322. While in an examplary embodiment the operating system 408 is stored in flash memory 324, the operating system 408 in other embodiments is stored in read-only memory (ROM) or similar storage element (not shown). As those skilled in the art will appreciate, the operating system 408, device application 358 or parts thereof may be loaded in RAM 326 or other volatile memory.

In one examplary embodiment, the flash memory 324 contains programs/applications 358 for execution on the device 300 including an address book 352, a personal information manager (PIM) 354, and the device state 350. Furthermore, programs 358 and other information 356 including data can be segregated upon storage in the flash memory 324 of the device 300.

When the device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UTMS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the communication device 300 must be properly enabled to transmit and receive signals from the communication network 319. Other systems may not require such identifying information. GPRS, UMTS, and EDGE require the use of a Subscriber Identity Module (SIM) in order to allow communication with the communication network 319. Likewise, most CDMA systems require the use of a Removable Identity Module (RUIM) in order to communicate with the CDMA network. The RUIM and SIM card can be used in multiple different communication devices 300. The communication device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in the presently described examplary embodiment is equipped with an integral or internal antenna 318 for transmitting signals to the communication network 319. Likewise the communication device 300 in the presently described examplary embodiment is equipped with another antenna 316 for receiving communication from the communication network 319. These antennae (316, 318) in another examplary embodiment are combined into a single antenna (not shown). As one skilled in the art would appreciate, the antenna or antennae (316, 318) in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which in the presently described examplary embodiment is a digital signal processor (DSP) 320.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

Example device applications that can depend on such data include email, contacts and calendars. For each such application synchronization with home-based versions on the applications can be critical for either or both of their long term and short term utility. As an example, emails are often time sensitive, so substantially real time synchronization is highly desirable. Contacts, on the other hand, can be usually updated less frequently without inconvenience. Therefore, the utility of the device 300 is significantly enhanced (if not enabled) when connectable within a communication system, and particularly when connectable on a wireless basis in a network 319 in which voice, text messaging, and other data transfer are accommodated.

As intimated hereinabove, one of the more important aspects of the handheld electronic device 300 to which this disclosure is directed is its size. While some users will grasp the device 300 in both hands, it is intended that a predominance of users will cradle the device 300 in one hand in such a manner that input and control over the device 300 can be effected using the thumb of the same hand in which the device 300 is held. However, it is appreciated that additional control can be effected by using both hands. As a handheld device 300 that is easy to grasp and desirably pocketable, the size of the device 300 must be kept commensurately small. Of the device's dimensions, limiting its width is important for the purpose of assuring cradleability in a user's hand. Moreover, it is preferred that the width of the device 300 be maintained at less than eight centimeters (approximately three inches). Keeping the device 300 within these dimensional limits provides a hand cradleable unit that users prefer for its usability and portability. Limitations with respect to the height (length) of the device 300 are less stringent when considering hand-cradleability. Therefore, in order to gain greater size, the device 300 can be advantageously elongated so that its height is greater than its width, but still remains easily supported and operated in one hand.

A potential drawback is presented by the small size of the device 300 in that there is limited exterior surface area for the inclusion of user input and device output features. This is especially true for the "prime real estate" on the front face 370 of the device 300, where it is most advantageous to include a display screen 322 that outputs information to the user. The display screen 322 is preferably located above a keyboard 332 that is utilized for data entry into the device 300 by the user. If the screen 322 is provided below the keyboard 332, a problem occurs in that viewing the screen 322 is inhibited when the user is inputting data using the keyboard 332. Therefore it is preferred that the display screen 322 be above the input area, thereby solving the problem by assuring that the hands and fingers do not block the view of the screen 322 during data entry periods.

To facilitate textual data entry into the device 300, an alphabetic keyboard 332 is provided. In the examplary illustrated embodiment, a full alphabetic keyboard 332 is utilized in which there is one key per letter (with some of the letter keys also having numbers, symbols, or functions associated with them). In this regard, the associated letters can be advantageously organized in QWERTY, QWERTZ, AZERTY, or Dvorak layouts, among others, thereby capitalizing on certain users' familiarity with these various letter orders. In order to stay within the bounds of the limited front surface area, however, each of the keys must be commensurately small when, for example, twenty-six keys must be provided in the instance of the English language.

As shown in FIG. 1, the handheld electronic device 300 is cradleable in the palm of a user's hand. The handheld device 300 is provided with a keyboard 332 to enter text data and place telephone calls and a display screen 322 for communicating information to the user. A connect/send key 605 is preferably provided to aid in the placement of a phone call. Additionally, a disconnect/end key 609 is provided. The send key 605 and end key 609 preferably are arranged in the navigation row 70 including the navigation tool 327. Additionally, the navigation row 70 preferably has a menu call-up key 606 and a back key or escape key 608.

The keyboard 332 includes a plurality of keys that can be of a physical nature such as actuable buttons, or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia representing character(s), command(s), and/or functions(s) displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of virtual keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular application or feature of the handheld electronic device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figure 3A:
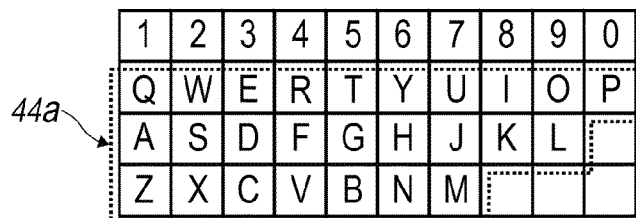
FIG. 3a illustrates an examplary QWERTY keyboard layout.
Figure 3B:
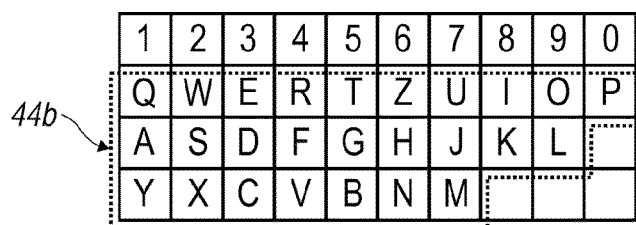
FIG. 3b illustrates an examplary QWERTZ keyboard layout.
Figure 3C:
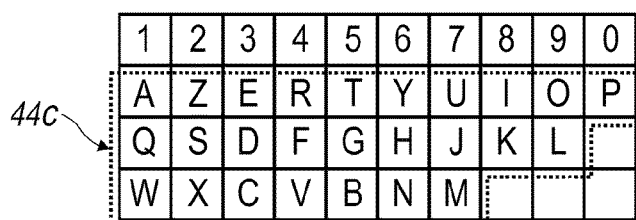
FIG. 3c illustrates an examplary AZERTY keyboard layout.
Figure 3D:
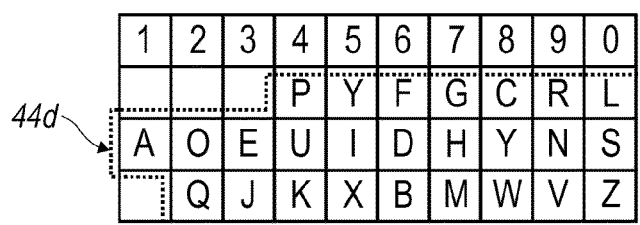
FIG. 3d illustrates an examplary Dvorak keyboard layout.

The various characters, commands, and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44*a* shown in FIG. 3*a*. The QWERTZ keyboard layout is normally used in German-speaking regions; this alphabetic key arrangement 44*b* is shown in FIG. 3*b*. The AZERTY keyboard layout 44*c* is normally used in French-speaking regions and is shown in FIG. 3*c*. The Dvorak keyboard layout was designed to allow typists to type faster; this alphabetic key arrangement 44*d* is shown in FIG. 3*d*. In other examplary embodiments, keyboards having multi-language key arrangements can be implemented.

Figure 9:
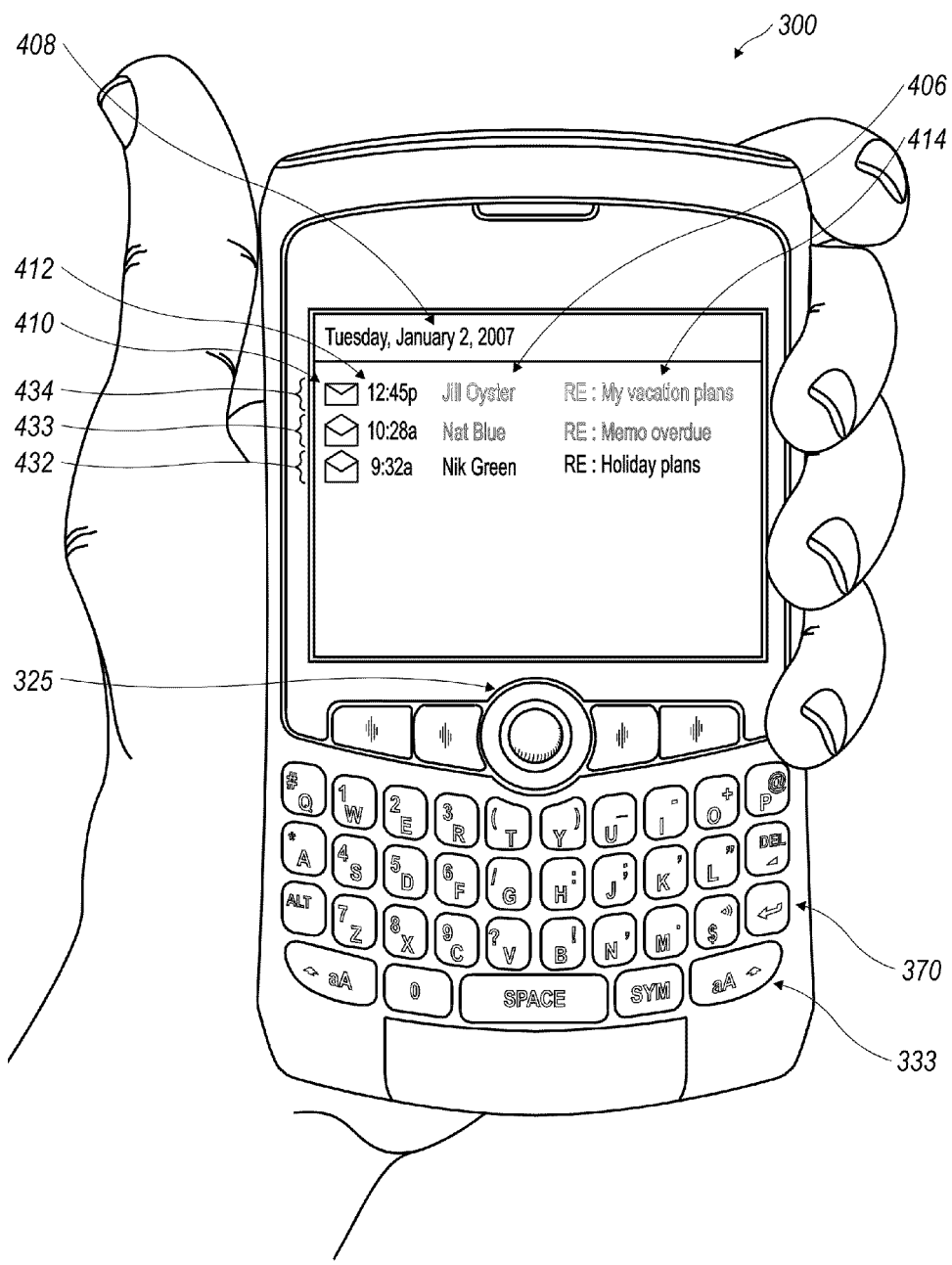
FIG. 9 illustrates yet another email listing shown on the display screen of the handheld wireless communication device, where the each email is color differentiated based upon a common characteristic.
Figure 10:
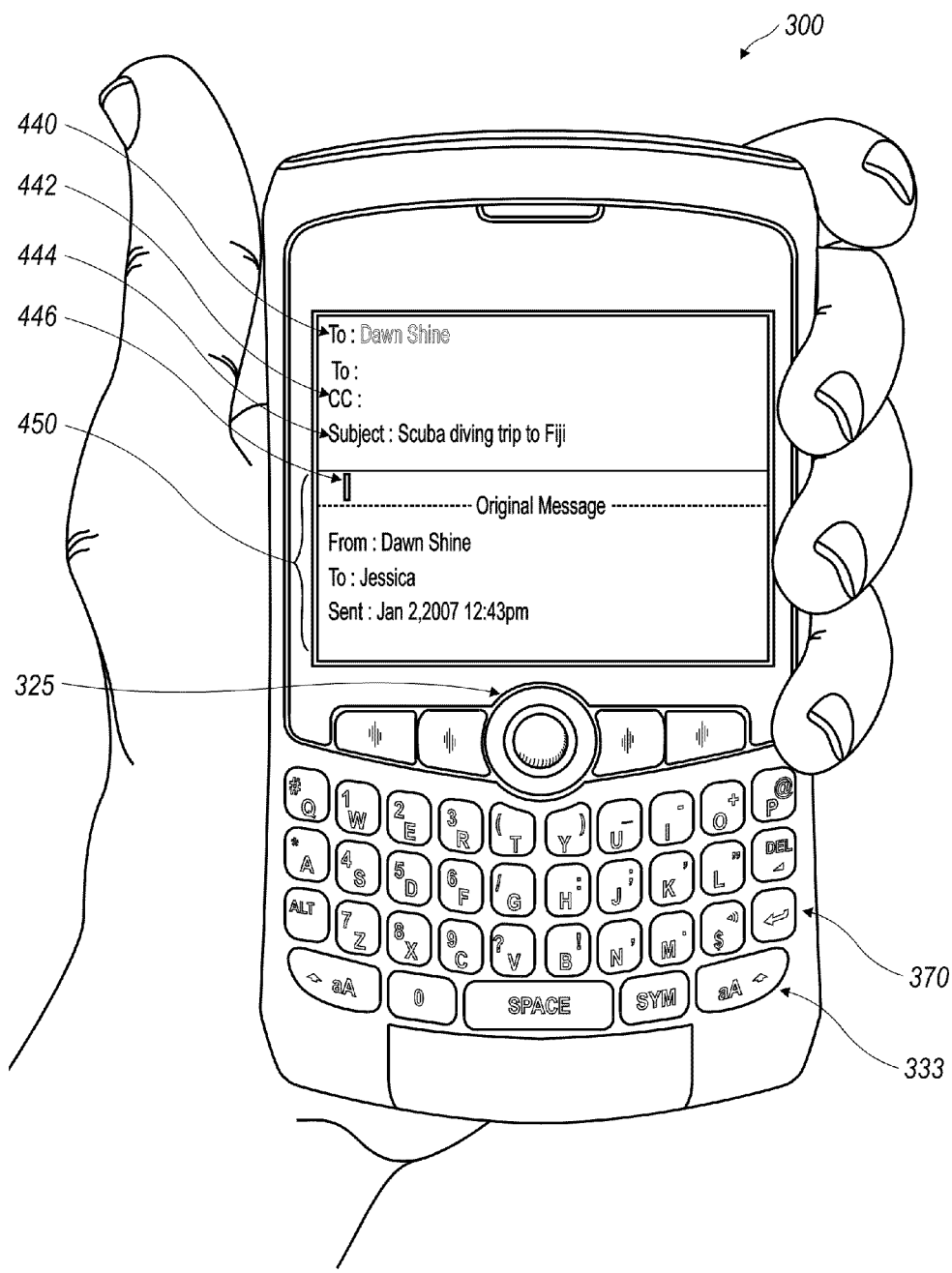
FIG. 10 illustrates an email message shown on the display screen, where the recipient is differentiated by color based upon a specified characteristic.

Alphabetic key arrangements are often presented along with numeric key arrangements. Typically, the numbers 1-9 and 0 are positioned in the row above the alphabetic keys 44*a-d*, as shown in FIG. 3*a-d*. Alternatively, the numbers share keys with the alphabetic characters, such as the top row of the QWERTY keyboard. Yet another examplary numeric key arrangement is shown in FIG. 4, where a "ten-key" style numeric keypad 46 is provided on a separate set of keys that is spaced from the alphabetic/numeric key arrangement 44. Still further, ten-key numeric arrangements may be common with or shared with a subset of the alphabetic keys, as best shown in FIGS. 9 and 10. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 5.

As shown in FIG. 5, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld devices 300 to include a combined text-entry keyboard and a telephony keyboard. Examples of such handheld devices 300 include mobile stations, cellular telephones, wireless personal digital assistants (PDAs), two-way paging devices, and others. Various keyboards are used with such devices and can be termed a full keyboard, a reduced-format keyboard, or phone key pad. In embodiments of a handheld device 300 having a full keyboard, the alphabetic characters are singly associated with the plurality of physical keys. Thus, in an English-language keyboard of this configuration, there are at least 26 keys in the plurality, with one letter per alphabetic key.

FIGS. 5 and 6 both feature numeric keys arranged according to the ITU Standard E.161 form. In addition, FIG. 6 also incorporates alphabetic characters according to the ITU Standard E.161 layout as well.

Reference is now made to FIGS. 7-11, which disclose an examplary embodiment having a full alphabetic keyboard arrangement. In particular, as shown in FIGS. 7-11, only one letter of the alphabet is associated with any given alphabetic key within the keys of the keyfield. This is in contrast to reduced-format arrangements, in which multiple letters of the alphabet may be associated with at least some of the alphabetic keys of a keyboard. Additionally, as alluded to above and shown in the referenced figures, some of the alphabetic keys also have numbers, symbols, or functions associated with them. In the specifically illustrated embodiment, the alphabetic keys (including those also having numbers, symbols, or functions associated with them) are arranged in a QWERTY arrangement, although any of the other full-keyboard arrangements (QWERTZ, AZERTY, or Dvorak) may also be implemented within the scope of this disclosure.

As described above, the International Telecommunications Union ("ITU") has established phone standards for the arrangement of alphanumeric keys. The standard phone numeric key arrangement shown in FIGS. 5 (no alphabetic letters) and 6 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. As shown in FIG. 9, the numeric key arrangement can be overlaid on a QWERTY arrangement. The numeric arrangement as shown can be aptly described as a top-to-bottom ascending order three-by-three-over-zero pattern.

While several keyboard layouts have been described above, the layouts can be described as having keys disposed on the keyboard in a QWERTY, reduced QWERTY, QWERTZ, Dvorak, or AZERTY key layout. These familiar keyboard layouts allow users to type more intuitively and quickly than, for example, on the standard alphabetic layout on a telephone pad. As mentioned above, the key arrangements can be reduced compared to a standard layout through the use of more than one letter or character per key. By utilizing fewer keys, the keys can be made larger and therefore more convenient to the user.

Figure 7:
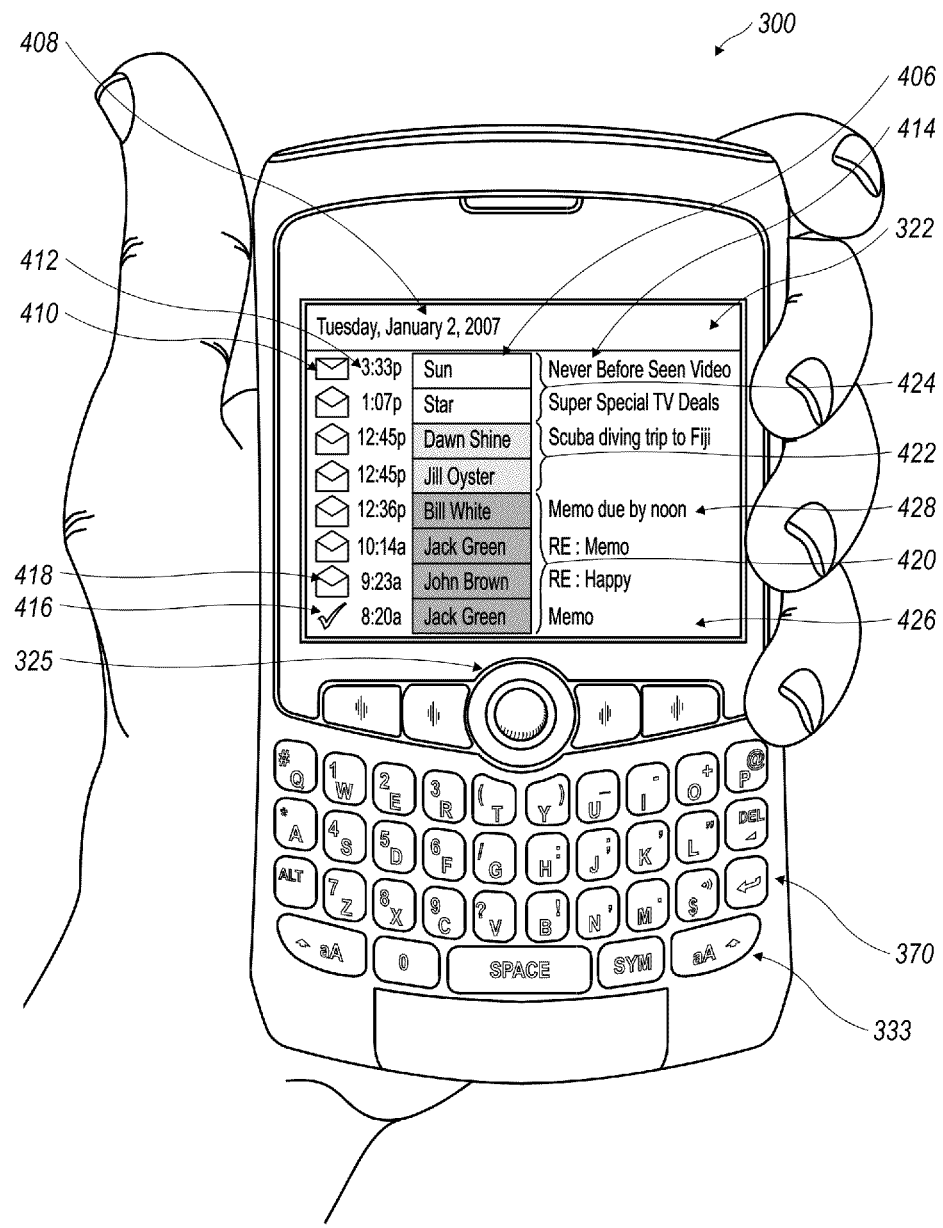
FIG. 7 illustrates an exemplary handheld device with an email listing shown on the display screen, where the email listing is differentiated using color based upon a common characteristic.

When the device is capable of sending and receiving text messages such as email messages, an email software program is implemented on the handheld device. In some examples, the email software is a stand alone application. In other examples, the email software can be integrated along with the operating system software. The email software program has an email application that is capable of displaying the email messages to the user. In one example, the email messages are presented by the email application as a listing as shown in FIG. 7. This listing of email messages can include both incoming and outgoing messages. For example, the email 426 at the bottom of the screen shown in FIG. 7 is a message that has been sent to Jack Green and the email 428 that is fourth from the bottom of listing is an email received from Bill White. In other examples, the messages are grouped according to whether the message was sent to or from the user's mailbox. The email listing can include an indicator icon 410 that informs the user whether message has been read, unread, sent, pending or failed to send. For example, a check mark 416 can be used to indicate that an email has been sent and an opened envelope 418 to indicate that an email has been opened. Other indicators are also considered within the scope of this disclosure, such as changing the style of font for the remaining displayed information of the email message to normal, bold, or italic font or some combination thereof. Additionally, a time stamp 412 and date stamp 408 can be provided to inform the user of the date and time the message was sent or received. Next, the name 406 of the sender or recipient is displayed. Furthermore, the subject 414 of the email message is displayed. In some embodiments, another icon is provided that informs the user of the priority of message such as high, low, or normal.

In at least one embodiment, the email software is capable of providing a color differentiation of the listed emails. This color differentiation can also be through a grayscale differentiation as well. These color differentiations allow for common characteristics to be differentiated.

In one example, the common characteristic is the name 406 of the sender or receiver of the email message. In another example, the common characteristic is a particular code associated with the sender or receiver of the email message. For example, emails from two different senders having the same host name would have the same color code. This can be helpful in determining emails from a particular organization or company that are sent via email. For example, the email software could be set up such that all emails that are from user's company or organization are identified by a particular color. For example, FIG. 7 depicts four emails 420 sent from the same organization that are color coded in the same fashion. As shown in FIG. 7, three color codings are shown based upon user defined criteria such that an organizational group 420, an approved group 422, and an unapproved group 424 are shown. In other embodiments, different groups or criteria can be used to generate different color differentiation.

The choices for the color coding can be user programmable, administrator programmable, or fixed. The colors and codes used to differentiate the incoming and outgoing email message's sender or receiver names can be defined by the user in at least one embodiment. For instance, the user could select all incoming messages transmitted by his or her supervisor to be a particular color. Likewise, the user could adjust the settings such that all incoming messages from others within his organization were a different color. The selectivity of the number of colors or codes could be set to a predetermined maximum, with a default color for any non-color coded messages. When the administrator is capable of controlling the color coding, the color coding can be preset by the administrator. Additionally, the administrator may allow the user the ability to modify the settings. Alternatively, the administrator may program the software on the handheld device 300 such that certain color code differentiations are routinely applied with additional capability for the user to add additional color codes. Furthermore, the device could be preset such that when a particular user's email address was entered, all emails received from a sender or sent to a recipient within the same organization would be color coded and all prohibited or otherwise restricted email messages would be differently colored.

Figure 8:
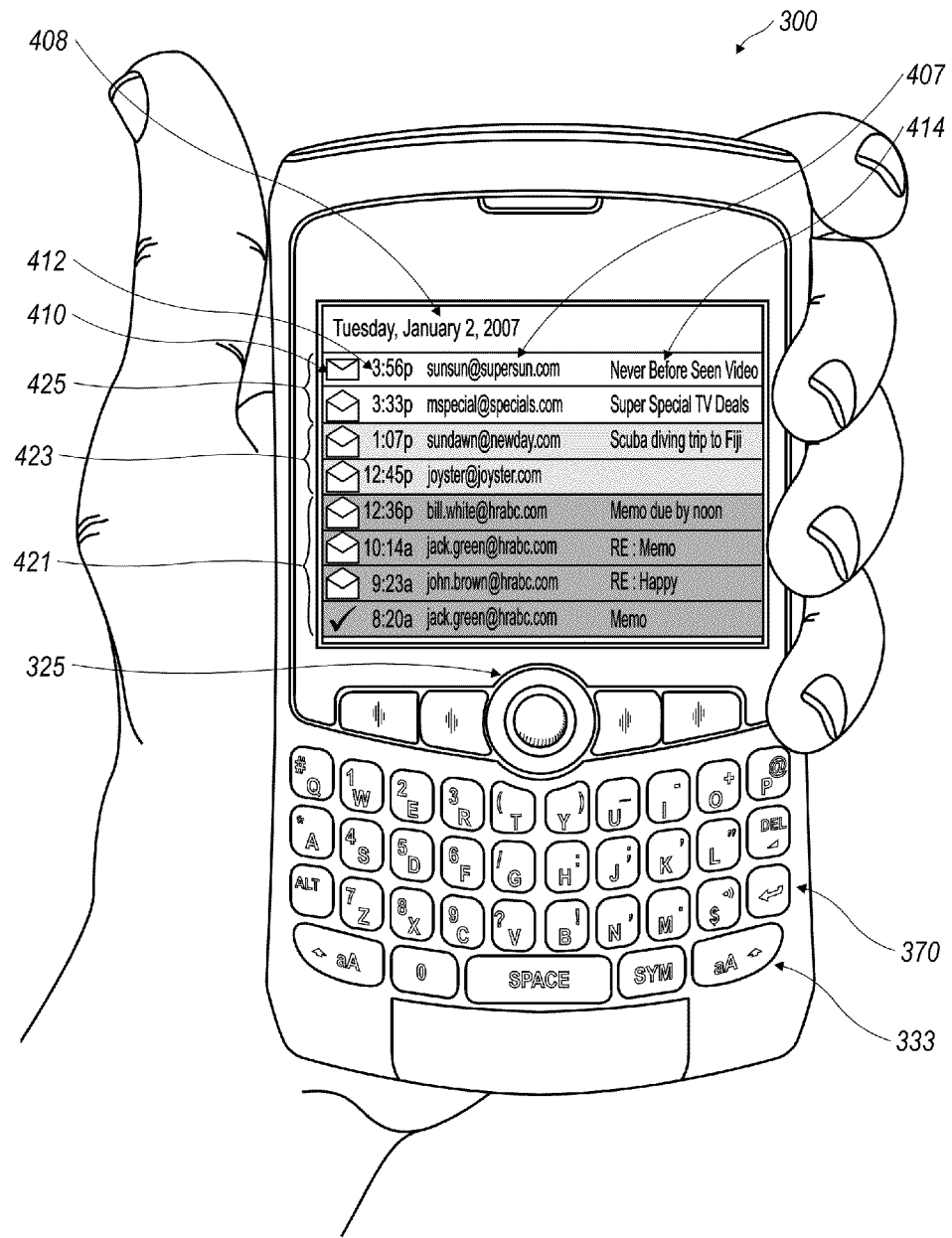
FIG. 8 illustrates another email listing shown on the display screen of the handheld wireless communication device, where the each email is color differentiated based upon a common characteristic.

The color coding of the emails is achieved through a variety of different ways. Some particular examples are provided herein, but these examples do not limit the scope of this disclosure and one skilled in the art would appreciate other color-coding possibilities. For example as shown in FIG. 7, when a user has the email display application programmed such that names 406 of the senders or recipients are displayed, the names 406 of the sender or recipient are colored according to the different color scheme. Alternatively as shown in FIG. 8, all information (such as indicator icon 410, time 412, email address 407, and subject 414) relating to a particular email in the listing could be colored in the same fashion as the name 406 in FIG. 7. In another example, only the portion which was related to particular code would be colored according to the criteria as set forth above. In another embodiment, the name or other portion of the email listing that is color coded could be color coded by having a the text portion of the email listing colored such as shown in FIG. 9.

In another examplary embodiment as shown in FIG. 8, the identification code or email address 407 of the sender or recipient is shown. The listing shown in FIG. 8 corresponds to the same listing as shown in FIG. 7, but the listing of FIG. 8 has the email address shown instead of the name of the sender or recipient. As illustrated in FIG. 9, the name 406 and the subject 414 are colored the same. In this color scheme, the text of the name 406 and subject 414 are colored according to the desired color scheme as implemented in the email display application.

In order to determine which email or email listing should be color coded, the email software could be programmed to examine the information contained within the email or the address associated with the sender or recipient. For example, the email software could apply color differentiation based upon the host name of the email sender or recipient. In at least one example, the host name refers to the portion of the email address that follows the symbol @ and precedes the domain extension such as .com and .org. As shown in FIG. 8, the portion that precedes the @ symbol of the email address 407 specifies the intended party. The portion after the @ symbol is either the company domain name or other domain name that the particular user is associated with. This domain name can be a public domain that allows users to sign up for free accounts or pay for account services through the company. For example, considering the email received at 9:23 am, the user name is "john.brown" and the company domain is "hrab-c.com."

While most of the above apply to both incoming and outgoing messages, outgoing messages can further benefit through the use of color coding of email addresses or email recipient names. For instance, a user may wish to reply to a message, but may not fully appreciate all of the intended recipients' names. Thus, the recipients' names or email addresses can be color coded as described above. This allows the sender of the email message to determine whether the recipients are those to whom the message to should be sent. For example, a user may receive an email message where two parties are involved in negotiation between each other and would like to safely remove all outside parties from the email. Through the use of color differentiation, the user could easily remove those outside the intended list and know those other party will not receive the message. Having the recipients and/or senders color differentiated allows the user of the handheld device to easily determine to the recipient or sender of the email message. Additionally, when the user is sending a confidential matter, which could have disastrous effect if sent to the wrong, an additional visual cue is provided to the sender of the email.

Figure 11:
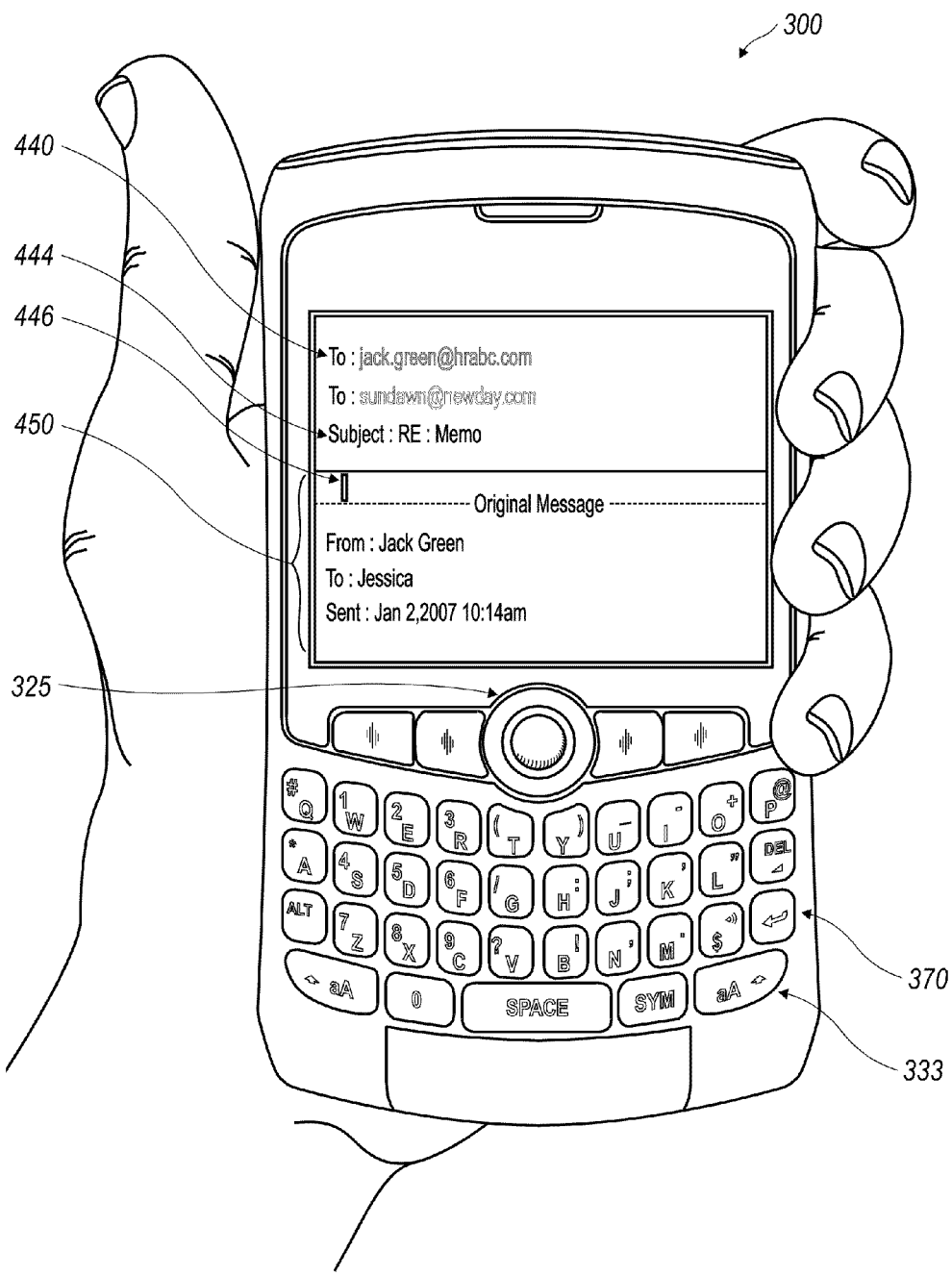
FIG. 11 illustrates another email message shown on the display screen, where the recipient is differentiated by color based upon a specified characteristic.

FIGS. 10 and 11 present two examplary embodiments of email programs where the user has initiated a response to a received email message. The email message response includes a "To:" field 440 which indicates the recipients of the email message, a "CC:" field 442 for carbon copying recipients, a "Subject:" field 444 which indicates the subject of the email, and the body 450 of the email. The body 450 of the email is where the user inputs text for transmission. If the email is a reply to a previous email, the body 450 can include at least a portion of the previous email message that was sent. A cursor 446 is often implemented as part of the email display program to indicate where the text will be input.

The recipient indicated in the "To:" field 440 can be colored so as to allow the user to differentiate among recipient addresses when sending a message. In the instance as shown in FIG. 10, the email is addressed to "Dawn Shine." This email address is color differentiated from other recipients and can be distinguished by the user when sending a message to a particular recipient. It is possible for the user to determine whether the recipient matches one of the predefined categories as described above. In this case, Dawn Shine would be an approved contact and have the color-coding associated with an approved contact. Thus, in the scenario where a user may have a contact that is an approved contact with the same name as an unapproved contact, the user can determine which one of these two contacts the email is addressed to or received from. In another embodiment shown in FIG. 11, the email is addressed to two recipients, namely Jack Green and Dawn Shine (the username sundawn). As shown in the figure, the email address information is shown. This setting may be preferred by some users and the email addresses are color-coded according to the one of the above mentioned common characteristics. This allows the user to both see the host name of the recipient as well as the color code and thus further ensure selecting the proper recipient of the email message.

While the above examples provided in FIGS. 10 and 11 are replies to emails, other embodiments of the presently described disclosure can include original email messages. In the embodiment where an original email is sent, the same basic information is involved.

While the above has been described in relation to email messages, other text or data messages sent to or from the handheld device can likewise be differentiated such as SMS and MMS messages.

In at least one embodiment, a handheld wireless communication device 300 that is configured to send and receive email text messages comprises a hand cradleable body configured to be held in a text entry orientation by an operator or user. (For example see FIGS. 1 and 7). The body of the handheld wireless communication device 300 has a front face 370 at which a display screen 322 is located and upon which information is displayed to the operator of the handheld device 300 in the text entry orientation. The handheld device 300 further comprises a microprocessor configured to run software programs on the handheld device 300 and to receive operator commands from user inputs, such as a keyboard 333 and trackball navigational tool 325, located on the handheld device 300.

One of the programs installed on the handheld device 300 is an email software program that can run on the microprocessor of the handheld device 300. The email software includes an email display application which displays a listing of a plurality of received emails on the display screen 322 and color-differentiates at least a portion of the display-listed plurality of received emails based on a characteristic common to each received email.

In at least one examplary embodiment, the common characteristic, which color differentiation is based, is a host name included in an identification code of the respective email's sender. The host name can include the domain name from which the message is sent as well as the domain listed as the reply address. As described above, the host name can be the portion that appears after the @ symbol in the identification code, such as the email address. Other codes can likewise be used, such as sender's name. The received emails that have like host names can be same-color coded, such as the organization group 420 as shown in FIG. 7. While in another example, received emails having different host names are different colored.

In yet another embodiment, the email software program identifies an email recipient uniquely color codes emails with the same host name in comparison to other display-listed received emails. While in another examplary embodiment the email software program classifies email based upon host names—if the email is an approved email source then it is uniquely color coded in comparison to the received emails listed on the display. In still another examplary embodiment, the email software program classifies received emails based upon an unapproved email source and the emails are uniquely color coded in comparison to other display-listed received emails. While the above embodiments have been described independent from each other, in at least one embodiment the received email is classified by the email software program using at least one of an approved email classification, an unapproved classification, and a same host name. In a particular embodiment, all of these classifications are implemented by the email software program.

Examples of these different color codes can be seen in FIGS. 7-9. In FIGS. 7 and 8, a listing of emails is shown on the display screen 322. The two listings shown in FIGS. 7 and 8 differ in how the recipient's or sender's identification is shown. As shown in FIG. 7, the identification of the recipient or sender involves displaying the name associated with that party. While in FIG. 8, the identification of the recipient or sender is indicated through an email address associated with that party. The emails in both FIGS. 7 and 8 are color-coded based upon groups such that there is an organizational group 420 (which in one embodiment has the same host name associated therewith), an approved group 422, and an unapproved group 424. The emails are respectively colored, respectively, based upon the following criteria: same organization as the operator, an approved list contacts, and an unapproved list. In yet another example as shown in FIG. 9, all the email messages are colored differently since each email 432, 433, 434 has a different host name associated therewith.

When a handheld device has an email software program as described above, the criteria for establishing the color-differentiation is required to be input into the email software program. In at least one embodiment, the criteria for color-differentiation is user programmable allowing the user to select which settings to be implemented along with its relevant color options. For example, the user could select whether to implement a color differentiation that allowed for certain messages from users within a particular host group to be color differentiated from other messages. The user could further select any one of the above described criteria for differentiating the recipient or sender of a given email message. In yet another embodiment, the criteria for color-differentiation is preset and non-changeable. Thus, the user would be required to use the preset criteria. While the user may not be able to program the desired criteria, at least one embodiment contemplates the use of administrator privileges that allow the administrator of the company to control the criteria for the handheld wireless communication devices.

When the user desires to send an email message from the handheld wireless communication device, an outbound email display application is implemented. This outbound email display application presents fields for the user to input data into such as a "To:" field, a "CC:" field, a "Subject:" field, and body field. In at least one embodiment, other addressing fields are implemented to further provide the user with different addressing options that are typically found within email programs. In one embodiment, the outbound email is color-coded prior to sending. The color-coding is based on a host name included in an identification code of the outbound email's recipient. When selecting the recipients of the email message, a portion of the email is color differentiated based upon one of the host name, an approved email recipient, and an unapproved email recipient. The host name is the part of the identification code as described above. Further examples of this have been provided above in relation to FIGS. 10 and 11.

The outbound email display application can also display a list of messages that have been sent from the device and at least a portion of the displayed email information is color-coded based upon a characteristic common to each sent email. This color-coding is based upon similar criteria to that of received email messages. In at least one embodiment, the characteristic common to each displayed email is a host name which is included in an identification code of the respective sent email's recipient. In other embodiments, the display-listed sent emails having like host names are same-color coded. In yet another embodiment, the display-listed emails having different host names are different-color coded. Furthermore, the software program can present emails that are uniquely colored if the email recipient is an approved recipient. While in another embodiment, a unique color coding is applied to portion of an email message when the email recipient is uniquely color coded.

The above described email software program can be implemented as part of a handheld wireless device as described above. The handheld wireless device can include a key field that is located below the display screen at the front face of the body and the key field comprises a plurality of keys of which a portion are alphanumeric input keys. These alphanumeric input keys comprise alphabetic keys which have letters arranged in one of the above described arrangements including but not limited to QWERTY, QWERTZ, AZERTY, and Dvorak arrangements. Furthermore, the arrangement can be of a full arrangement or reduced arrangement as described above, wherein the reduced arrangement has more than one letter associated with at least one key. As shown in FIG. 7, a full QWERTY arrangement is provided on keyboard 333 along with additional numeric, symbol and function keys. A reduced QWERTY arrangement is presented in FIG. 1. Additionally, a trackball navigation tool is located between the display and the key field in the text entry orientation.

Figure 12:
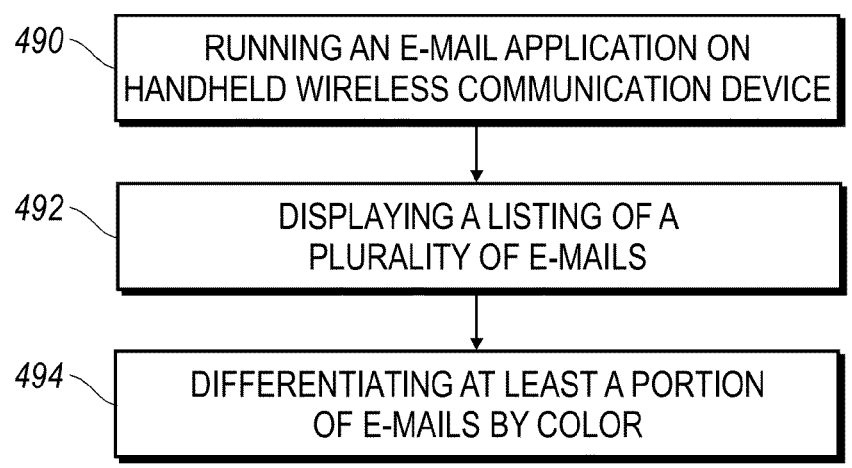
FIG. 12 is a flow chart illustrating an examplary method for color differentiating an email based upon a specified criterion.

In yet another embodiment, the present disclosure includes a method for color differentiating at least a portion of a displayed email message on a handheld wireless communication device. An examplary method is described in relation to FIG. 12. The method includes running an email application on a handheld wireless communication device (block 490). The email application is capable of displaying a listing of a plurality of received emails on a display screen of the handheld wireless communication device (block 492). Additionally, the method includes differentiating at least a portion of the emails displayed on the display screen by color (block 494), wherein the differentiation is based upon a characteristic common to each received email. When the messages are sent to the same host name, the method further colors at least a portion of the email messages the same as other email messages to other users having the same host name.

While the above examples have been described in relation to email, one skilled in the art would appreciate the necessary modifications to allow lists and programs for SMS, MMS, PIN messages, instant messages, and similar messages to be displayed according to the above description provided in relation to email messages. Thus instead of an email program, the program could be one directed towards one of the above types of messages or the program could be capable of displaying all of the above types of messages. Likewise, the message that is displayed could be one of the above messages.

Examplary embodiments have been described hereinabove regarding both handheld wireless communication devices 300, as well as the communication networks 319 within which they operate. Again, it should be appreciated that the focus of the present disclosure is an email software program that is capable of displaying a listing of received emails and color-differentiating at least a portion of the display listed emails based upon a characteristic common to each received email.

What is claimed is:

1. A wireless communication device comprising:
   a display for displaying email messages;
   an input interface for entering email message content;
   a microprocessor configured to:
      associate a first color with a first message address characteristic and a second color with a second message address characteristic, wherein the first color is different from the second color;
      accept a message address for an email message;
      examine the message address to identify a characteristic of the message address, wherein the characteristic is one of an email message recipient host name, a domain name, an approved email message recipient, and an unapproved email message recipient;
      before transmission of the email message including the message address, display at least a portion of the email message on the display, wherein the displayed portion of the email message is color-coded with the first color when the identified characteristic is the first message address characteristic and the displayed portion of the email message is color-coded with the second color when the identified characteristic is the second message address characteristic.

2. The wireless communication device of claim 1, wherein the characteristic is selectable.

3. The wireless communication device of claim 1, further comprising memory comprising a list of email message recipient characteristics.

4. The wireless communication device of claim 1, wherein an address of the color-coded email message is color-coded by displaying colored text on the display.

5. A wireless communication device comprising:
   a display for displaying email messages;
   an input interface for entering email message content;
   a microprocessor configured to:
      associate a first color with a first message address characteristic and a second color with a second message address characteristic, wherein the first color is different from the second color;
      accept a message address for an email message;
      examine the message address to identify a characteristic of the message address;
      before transmission of the email message including the message address, display at least a portion of the email message on the display, wherein the displayed portion of the email message is color-coded with the first color when the identified characteristic is the first message address characteristic and the displayed portion of the email message is color-coded with the second color when the identified characteristic is the second message address characteristic;
      display address information for each of a plurality of message addresses, wherein the address information includes visual cues to identify address information based on the identified characteristic.

6. The wireless communication device of claim 5, wherein the visual cues comprise color coding.

7. The wireless communication device of claim 5, wherein the visual cues comprise color coding of information related to the address information.

8. The wireless communication device of claim 5, wherein the visual cues comprise color coding of the address information.

9. A method comprising:
   associating a first color with a first message address characteristic and a second color with a second message address characteristic, wherein the first color is different from the second color;
   accepting an email message, including an email message address and content, input to a wireless communication device;
   examining the accepted email message address to identify a characteristic of the accepted email message address, wherein the characteristic is one of an email message recipient host name, a domain name, an approved email message recipient, and an unapproved email message recipient; and
   before transmission, displaying at least a portion of the accepted email message on a display of the wireless communication device, the email message being color-coded with the first color when the identified characteristic is the first message address characteristic and the email message being color-coded with the second color when the identified characteristic is the second message address characteristic.

10. The method of claim 9, further comprising the operation of accepting a selection the characteristic of the email message address.

11. The method of claim 9, further comprising the operation of displaying the accepted email message address prior to transmitting the email message content.

12. The method of claim 9, further comprising the operation of displaying a list of email messages sent from the device.

13. A method comprising:
   associating a first color with a first criterion for differentiation and a second color with a second criterion for differentiation, wherein the first color is different from the second color;
   displaying a message including address information for at least one recipient before transmitting the message;
   examining the address information for an identified criterion for differentiation, wherein the identified criterion for differentiation is one of approved, unapproved, prohibited, and restricted
   before transmitting the message, displaying message information including a name of a recipient associated with the address information on a display of a wireless communication device, wherein one of the name of the recipient and the address information is color-coded with the first color when the identified criterion is the first criterion for differentiation and one of the name of the recipient and the address information is color-coded with the second color when the identified criterion is the second criterion for differentiation.

14. The method of claim 13, wherein the identified criterion for differentiation is a company or organization.

15. The method of claim 13, wherein the identified criterion for differentiation is a same organization as a sender of the message.

16. The method of claim 13, wherein the examining comprises identifying a host name in the address information.

17. The method of claim 13, wherein the message is one of an email message and a text message.

18. The method of claim 13, wherein the identified criterion for differentiation is a domain name.

19. A method comprising:
- associating a first color with a first message address characteristic and a second color with a second message address characteristic, wherein the first color is different from the second color;
- accepting, by a wireless communication device, a message address;
- examining the message address to identify a characteristic of the message address, wherein the characteristic is one of an email message recipient host name, a domain name, an approved email message recipient, and an unapproved email message recipient; and
- before transmission of a message including the message address, displaying message information including a name of a recipient associated with the message address on a display of a wireless communication device, wherein at least one of the name of the recipient and the message address is color-coded with the first color when the identified characteristic is the first message address characteristic and at least one of the name of the recipient and the message address is color-coded with the second color when the identified characteristic is the second message address characteristic.

20. The method of claim 19, wherein the first color and the second color are user programmable.

21. The method of claim 19, wherein the first color and the second color are administrator programmable.

22. The method of claim 19, wherein the message comprises an email message.

23. The method of claim 19, wherein the message comprises a short message service message.

24. The method of claim 19, wherein the message comprises one message of a list of messages, wherein a plurality of messages in the list of messages is color-coded.

25. The method of claim 19, where in a subject of the message is color-coded.

26. The method of claim 19, wherein one of the first color and the second color is a default color.

27. The method of claim 19, wherein the characteristic of the message address is a domain name.

28. The method of claim 19, further comprising displaying address information for each of a plurality of message addresses, wherein the address information includes visual cues to identify address information based on the identified characteristic.

* * * * *